Patented Jan. 14, 1941

UNITED STATES PATENT OFFICE 2,228,416

AZO DYES

Chiles E. Sparks, Stewart C. Hussey, William B. Reynolds, and Swanie S. Rossander, Wilmington, Del., assignors to E. I. du Pont de Nemours & Company, Wilmington, Del., a corporation of Delaware No Drawing. Application June 4, 1938, Serial No. 211,799

14 Claims. (Cl. 8—41)

A. This invention relates to new azo dyes of the type whose properties are improved by aftertreatment with formaldehyde. The invention relates to the dyes both before and after such treatment.

B. It was long ago proposed to treat certain azo dyes on the fiber with formaldehyde to improve the properties thereof. Examples thereof are shown in U. S. Patents 1,150,656, 1,169,329, 1,090,379, 1,125,050, 1,087,430, and 1,082,925. Depite the existence in the art of such colors, however, the dye industry has gone more and more to the use of two bath processes in which the one intermediate is applied to the fiber in one bath and the other added in the second bath, or in which the intermediates are stabilized against each other in a paste and then reacted on the fiber, because such colors have properties superior to those which are possessed by the types of direct, formaldehyde-treated dyes of these references. It is, however, highly desirable to apply complete dyes directly provided the complete color has the requisite brilliance and fastness.

C. It is, accordingly, an object of this invention to prepare direct dyes of high quality and fastness when after-treated with formaldehyde.

D. The objects of the invention are accomplished, generally speaking, by azotizing a compound represented by the formula:

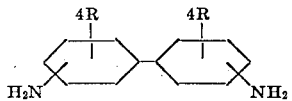

in which each R is one of the group consisting of hydrogen, alkyl, aryl, aralkyl, halogen, alkoxy, nitro, sulfonic, carboxylic, and CN; coupling the azotized compound to one of the following components: an amino-phenyl-pyrazolone; a 1-amino-naphthalene represented by the formula:

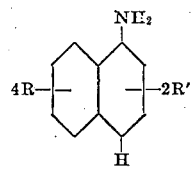

in which each R' is one of the group consisting of hydrogen, alkyl, and alkoxy, and the —H indicates that the indicated position is not substituted by R or R'; an amino-benzene represented by the formula:

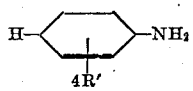

a 1-amino-naphthalene sulfonic acid represented by the formula:

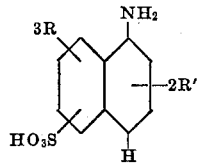

an amino-naphthol-mono-sulfonic acid represented by the formula:

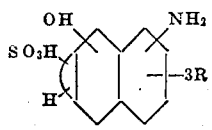

in which it is preferred that the nucleus shall contain only one sulfonic acid group; and an amino-benzoyl-amino-naphthal-sulfonic a c i d. The compound so formed is azotized and coupled to a 1,3-dihydroxy-benzene of the formula:

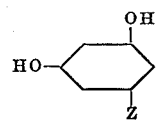

where Z is one of the following group: H, OH, alkyl, alkoxy, amino, SO₃H, COOH, halogen, and CN; dyeing appropriate material therewith and reacting the product on the material with formaldehyde. The dyes untreated with formaldehyde are also claimed to the extent that they are new.

Examples of the diphenyl components are: 4,4'-diamino-3,3'-dimethyl-diphenyl; 4,4'-diamino-3,3'-dimethoxy-diphenyl; 2,2'-dichloro-4,4'-diamino-diphenyl; 2,2'-dichloro-3,3'-dimethyl-4,4'-diamino-diphenyl; 2,2'-dimethyl-5,5'-dimethoxy-4,4'-diamino-diphenyl; 3,3'-dimethoxy-4,4'-diamino-6,6'-dichloro-diphenyl; 4,4'-diamino-diphenyl-2,2'-disulfonic acid.

Examples of the pyrazolone type components described in the preceding paragraph are:

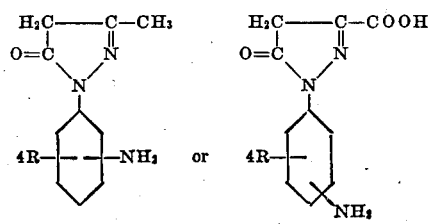

Examples of the amino-benzoyl-amino-naphthol sulfonic acid are:

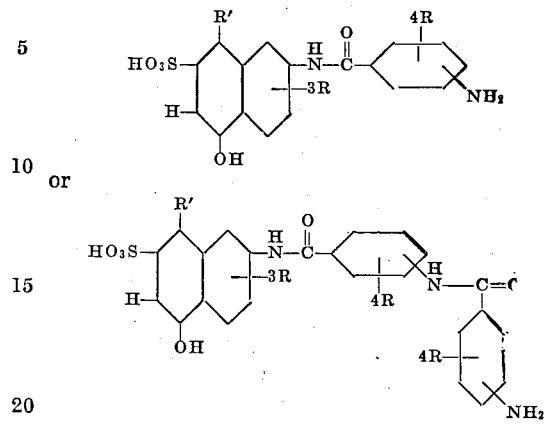

or

The preferred end component is 1,3-dihydroxybenzene. The completed compounds have the type formula before the formaldehyde treatment: A←Y←X→Y→A in which X is the component first described in the preceding paragraph; Y is the component next described, and A is the compound last described in said paragraph, of which class resorcin is preferred.

Where a symbol such as 4R is used, it means that the indicated number of members of the group R appear as substituents in the nucleus. For example, it could means three hydrogens and a methyl (both being in the group R); or two alkyls, a halogen, and a hydrogen; or any other combination of members of that group.

trazo solution should be distinctly acid to Congo red paper.

Stir 294 parts of 2-(4'-amino benzoyl) amino-5-naphthol-7-sulfonic acid with 2500 parts of water. Add 14 parts of 100% ammonia or in sufficient quantity for complete solution and to a slightly alkaline reaction on Brilliant Yellow paper. Ice to 0° C. Add 7 parts of sodium bicarbonate. Stir until dissolved. Add 170 parts of sodium carbonate.

Add the tetrazo slowly to the alkaline coupling solution. Maintain an excess of 2-(4'-amino benzoyl) amino-5-naphthol-7-sulfonic acid and a temperature of 0-5° C. The suspension should be alkaline to Brilliant Yellow paper. Stir one hour. Heat to 70-80° C. Salt slowly 5% with sodium chloride. Filter.

Slurry the filter cake with 3500 parts of water. Add 91 parts of 100% hydrochloric acid as a 30% solution. Ice to 5-10° C. Add 55 parts of 100% sodium nitrite as a 30% solution. Tetrazotize at 10° C. for one hour.

Dissolve 105 parts of 1,3-dihydroxy benzene in 2000 parts of water. Ice to 0° C. Add 212 parts of sodium carbonate.

Add the tetrazo slowly to the alkaline solution of 1,3-dihydroxy benzene. Stir one hour after the addition. There should be an excess of 1,3-dihydroxy benzene. Heat to 60-70° C. Salt slowly 10% with sodium chloride. Filter. Dry at 80-85° C. in an oven. The powder is a light red in appearance and, when dyed and after-treated as described below, yields bright scarlet shades showing excellent fastness to washing and discharge properties.

The formula for the dye is probably:

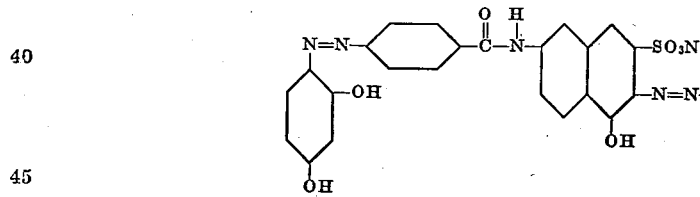
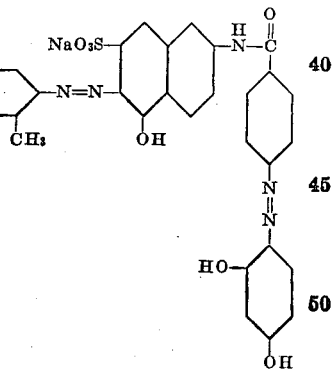

To have a small number of non-hydrogen substituents is in accordance with the better practice because of cost and complexity in manufacture. Where R appears in one ring of a naphthalene nucleus and R' in the other, it is to be understood that each said symbol appears only in the indicated half of the nucleus. On the other hand, where a symbol is shown alone in a naphthalene nucleus, it may appear at any replaceable position.

E. The following examples illustrate but do not limit the invention:

EXAMPLE I

Stir 113 parts of 2,2'-dichloro-3,3'-dimethyl-4,4'-diamino diphenyl with 2500 parts of water to a smooth slurry. Add 73 parts of 100% hydrochloric acid as a 30% solution. Ice to 10° C. Add 55 parts of 100% sodium nitrite as a 30% solution and tetrazotize at 10-15° C. for one hour with a distinct excess of nitrite. The te- The dye is conveniently applied to the fiber and after-treated as follows:

Dissolve 0.2 grams of the product in 50 ml. water at 190-200° F., adding 0.4 gram of sodium carbonate to assist the solution. Dilute with stirring to a total volume of 500 ml. with water at approximately 160° F. Add 40 ml. of a 10% solution of Glauber's salt. Wet out a 10 gram piece of rayon with water, squeeze partially dry, and enter this into the dye bath. Raise the temperature of the dye bath to 180-190° F. in the course of fifteen minutes. Hold the dye bath at that temperature for one hour. Stir the dyeings at frequent intervals during this time. At the end of one hour remove the dyeing and rinse in cold water.

*After-treatment in a fresh bath*

To 500 ml. of water at 130-140° F. add the rinsed dyeing from the above operation. Then add approximately 10 ml. of 10% formaldehyde (25 ml. of approximately 37% formaldehyde by weight, diluted to 250 cc. with water). Hold at this temperature for twenty minutes. Remove the dyeing, rinse and dry.

After-treatment in the dye bath

An alternative after-treating process, which is the preferred procedure because of its economy and ease of application, is carried out as follows:

At the end of the dyeing period add to the dye bath 10 ml. of 10% formaldehyde as in the preceding example at bath temperature. Remove the dyeings after twenty minutes. Rinse and dry.

A dyeing with a bright orange shade is obtained which shows excellent fastness to washing and yields white discharges.

It is understood that we are not limiting ourselves to the exact conditions of the above operations which may be varied within reasonable limits as will be readily recognized by one skilled in the art without essentially altering the dyeing and fastness properties of the subject product.

EXAMPLE II

Stir 92 parts of 4,4'-diamino diphenyl and 4000 parts of water until a smooth slurry is obtained. Add 91 parts of 100% hydrochloric acid as a 30% solution. Ice to 5° C. Add 69 parts of 100% sodium nitrite as a 30% solution. Tetrazotize at 5–10° C. for one-half to three-quarters hour with a distinct excess of nitrite.

Stir 250 parts of 2-amino-5-naphthol-7-sulfonic acid with 5000 parts of water. Add 106 parts of sodium carbonate. Stir until dissolved. Ice to 0° C. Add 265 parts of sodium carbonate.

Add the tetrazo slowly to the alkaline coupling solution. Stir one hour after the addition. There should be a distinct excess of 2-amino-5-naphthol-7-sulfonic acid and the suspension should be strongly alkaline to Brilliant Yellow paper. Heat to 60–70° C. Salt 15% with sodium chloride. Filter.

Stir the filter cake and 4000 parts of water to a smooth slurry. Add 110 parts of 100% hydrochloric acid as a 30% solution. Ice to 10° C. Add 69 parts of 100% sodium nitrite. Tetrazotize for one hour at 10–15° C.

Dissolve 132 parts of 1,3-dihydroxy benzene in 2500 parts of water. Ice to 0° C. Add 215 parts of sodium carbonate.

Add the tetrazo slowly to the alkaline 1,3-dihydroxy benzene solution. Stir one hour after the addition. The suspension should be Brilliant Yellow and there should be an excess of 1,3-dihydroxy benzene. Heat to 60–70° C. Salt 15% with sodium chloride. Filter. Dry at 80–85° C. in an oven. The black powder yields a blue black color of excellent washing fastness.

The probable formula is:

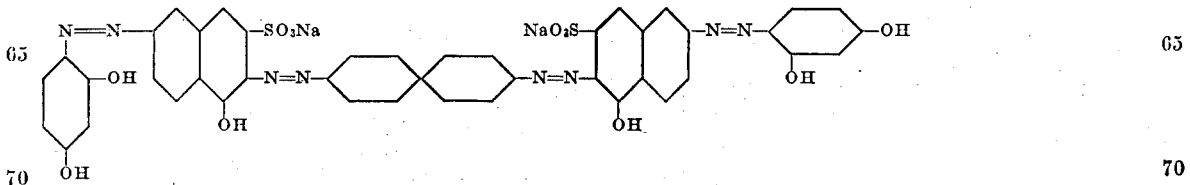

F. The products listed in the following table are prepared and applied by methods analogous to those listed above, the most applicable method being easily ascertained by one skilled in the art for any specific example.

TABLE

| Example No. | Combination | Shade |
|---|---|---|
| 3 | 4,4'-diamino diphenyl⇒(2-amino-8-naphthol-6-sulfonic acid)₂⇒(1,3-dihydroxy benzene)₂. | Blue black. |
| 4 | 4,4'-diamino diphenyl⇒(1-(3'-amino phenyl)-5-pyrazolone-3-carboxylic acid)₂ ⇒(1,3-dihydroxy benzene)₂. | Red. |
| 5 | 4,4'-diamino-3,3'-dimethoxy diphenyl ⇒(1-amino-5-naphthol-7-sulfonic)₂ ⇒(1,3-dihydroxy benzene)₂. | Blue black. |
| 6 | 4,4'-diaminio-3,3'-dimethoxy diphenyl ⇒(2-amino-5-naphthol-7-sulfonic acid)₂⇒(1,3-dihydroxy benzene)₂. | Red blue. |
| 7 | 4,4'-diamino-3,3'-dimethyl diphenyl ⇒(1-(3'-amino phenyl)-5-pyrazolone-3-carboxylic acid)₂⇒(1,3-dihydroxy benzene)₂. | Red. |
| 8 | 4,4'-diamino-2,2'-dichloro diphenyl⇒(2-amino-5-naphthol-7-sulfonic acid)₂ ⇒(1,3-dihydroxy benzene)₂. | Rubine. |
| 9 | 4,4'-diamino-2,2'-dichloro-3,3'-dimethyl-diphenyl⇒(1,3'-amino phenyl)-5-pyrazolone-3-carboxylic acid)₂⇒(1,3-dihydroxy benzene)₂. | Orange. |
| 10 | 4,4'-diamino diphenyl-2,2'-disulfonic acid ⇒(2-amino-5-naphthol-7-sulfonic acid)₂⇒(1,3-dihydroxy benzene)₂. | Violet. |
| 11 | 2,2'-dimethyl-5,5'-dimethoxy-4,4'-diamino-diphenyl⇒(1-(3'-amino-phenyl)-5-pyrazolone-3-carboxylic acid)₂⇒(1,3-dihydroxy benzene)₂. | Red orange. |
| 12 | 4,4'-diamino-diphenyl-2,2'-disulfonic acid ⇒(1-amino-naphthalene)₂⇒(1,3-dihydroxy-benzene)₂. | Maroon. |
| 13 | 4,4'-diamino-diphenyl-2,2'-disulfonic acid ⇒(2-methoxy-5-methyl-1-amino-benzene)₂⇒(1,3-dihydroxy-benzene)₂. | Violet. |
| 14 | 4,4'-diamino-diphenyl-2,2'-disulfonic acid ⇒(1-amino-naphthalene-6-sulfonic acid)₂⇒(1,3-dihydroxy-benzene)₂. | Do. |
| 15 | 6,6'-dichloro-3,3'-dimethoxy-4,4'-diamino-diphenyl⇒(2-(4'-amino-benzoyl-amino)-5-naphthol-7-sulfonic acid)₂ ⇒(1,3-dihydroxy benzene)₂. | Red brown. |
| 16 | 4,4'-diamino-2,2'-dichloro-3,3'-dimethyl-diphenyl⇒(2-(4'-amino-benzoyl-amino)-5-naphthol-7-sulfonic acid)₂ ⇒(1,3-dihydroxy-5-benzene-sulfonic acid)₂. | Scarlet. |

G. Deeper shades with better light fastness are produced by after-treatment of these colors with copper salts. This after-coppering operation may be carried out by coppering before, with, or after the formaldehyde treatment. A 5% solution of hydrated copper sulfate produces satisfactory results. This double after-treatment operation may be done either in the dye bath or in a fresh bath as detailed in Example I. It may be carried out by adding the formaldehyde solution as above and, after an interval of twenty minutes, the copper sulfate. The treatment is continued for twenty minutes. The dyeings are then removed, rinsed, and dried. Closely similar results are obtained by reversing the order of adding the reagents, that is by adding the copper sulfate solution first, treating for twenty minutes and then adding the formaldehyde solution. After twenty minutes the dyeings are removed, rinsed and dried.

H. In the trade there is a demand for colors which are fast to washing, which will not stain attached undyed fibers, and which can be applied by a process more simple than the so-called diazo process. These dyes are an answer to this demand of the trade. They have washing fastness equal, and in many cases much superior, to the so-called diazo colors. This advantage is very great from a standpoint of cost and ease of application. Equal or superior fastness can be obtained with less effort and less material expense on the part of the dyer. The azotization and development of the dyes on the fiber, as is required in the so-called diazo process, is unnecessary with these colors. There are three baths necessary in the so-called diazo process and only one is necessary in this process, although as hereinbefore mentioned two baths can be used. In the case of diazo colors a shade change occurs when the development takes place on the fiber. This change is undesirable and makes it difficult for the dyer to apply his shades accurately. These dyes present a solution to that problem because the formaldehyde after-treatment produces practically no change in shade. These colors also have outstanding discharge properties, being in that respect at least equal, and in many instances far superior, to the dyes of equivalent shades now on the market.

I. The dyes can be applied to widely different materials, such as silk, wool, and leather, but they are of particular importance in connection with the dyeing of cellulose and regenerated cellulose. Some of the cellulose esters and ethers can also be dyed with highly satisfactory results.

J. As many apparently widely different embodiments of the invention may be made without departing from the spirit and scope thereof, it is to be understood that we do not limit ourselves to the specific embodiments thereof except as defined in the appended claims.

We claim:

1. The compounds represented by the formula: [A←Y←X→Y→A] in which each A is a radical of the formula:

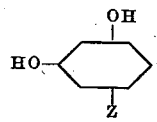

wherein Z is one of the group consisting of H, OH, alkyl, alkoxy, amino, halogen, CN, sulfonic acid, and carboxyl; each Y is the same one of the group consisting of a diazotized radical, connected to A by the azo group, from the class consisting of an amino-phenyl-pyrazolone; a compound represented by the formula:

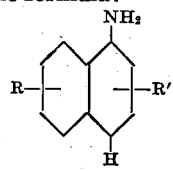

a compound represented by the formula:

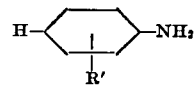

a compound represented by the formula:

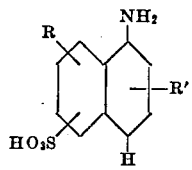

a compound represented by the formula:

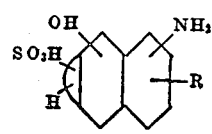

and an amino-benzoyl-amino-naphthol-sulfonic acid; and wherein X is tetrazotized dihalogeno diamino diphenyl, in which formulas the symbol R means one or more of a group consisting of hydrogen, alkyl, aryl, aralkyl, halogen, alkoxy, nitro, sulfonic, carboxylic, and CN, and R' means one or more of a group consisting of hydrogen, alkyl, alkoxy, and the symbol H as applied to an aryl nucleus means that that position is unsubstituted by R and R'.

2. Compounds of the type A←Y←X→Y→A, where A is resorcin, Y is one of a group consisting of an amino-phenyl-pyrazolone, an amino-naphthol-sulfonic acid, an amino-benzoyl-amino-naphthol-sulfonic acid, and an amino-benzoyl-amino-benzoyl-amino-naphthol-sulfonic acid, and X is a tetrazotized diamino-diphenyl substituted in the 2,2'-positions by Cl.

3. Compounds of the type A←Y←X→Y→A where A is resorcin, Y is an amino-naphthol-sulfonic acid, and X is a tetrazotized diamino-diphenyl substituted in the 2:2' positions by chlorine.

4. The compounds of claim 1 after treatment with a copper salt.

5. The coppered compounds of claim 1 where A is resorcin.

6. The compounds represented by the formula:

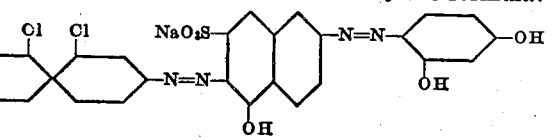

7. The compounds represented by the formula:

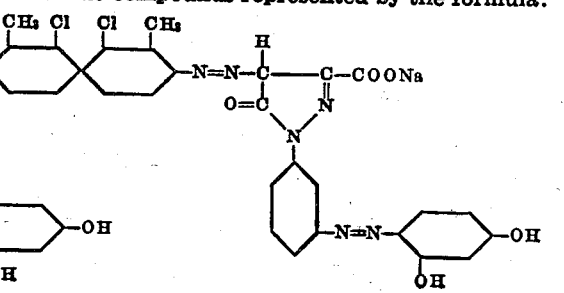

8. The process which comprises dyeing a fiber with a compound described in claim 1 and treating the dyed fiber with formaldehyde.

9. The product being the formaldehyde complex of a compound represented by the formula of claim 1.

10. The product being the formaldehyde complex of the compound represented by the formula of claim 6.

11. The product being the formaldehyde complex of the compound represented by the formula of claim 7.

12. Compounds of the type A←Y←X→Y→A where A is resorcin, Y is an amino-phenyl-pyrazolone, and X is a tetrazotized diamino-diphenyl substituted in the 2:2' positions by chlorine.

13. Compounds of the type A←Y←X→Y→A where A is resorcin, Y is an amino-benzoyl-amino-naphthol sulfonic acid, and X is a tetrazotized diamino-diphenyl substituted in the 2:2' positions by chlorine.

14. The composition of matter represented by the formula:

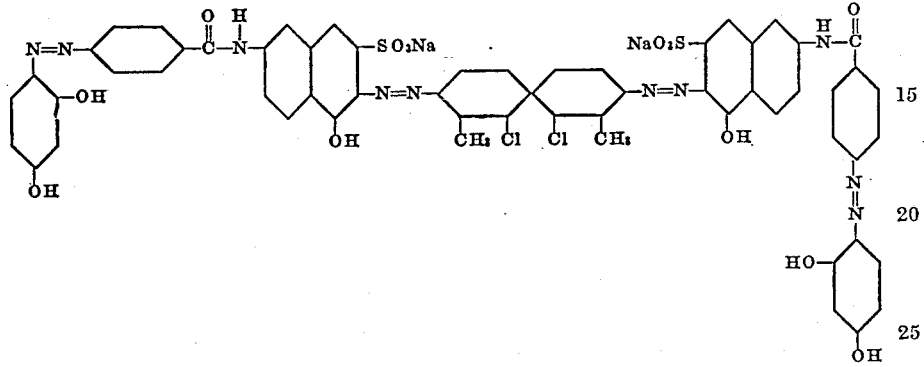

CHILES E. SPARKS.
STEWART C. HUSSEY.
WILLIAM B. REYNOLDS.
SWANIE S. ROSSANDER.

Certificate of Correction

Patent No. 2,228,416. January 14, 1941.

CHILES E. SPARKS ET AL.

It is hereby certified that errors appear in the printed specification of the above numbered patent requiring correction as follows: Page 2, first column, line 15, the last portion of the formula should read

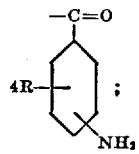

line 33, for the word "means" read *mean*; page 4, first column, lines 37 to 41 inclusive, claim 1, strike out the formula and insert instead the following—

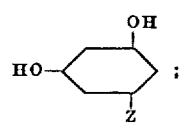

and that the said Letters Patent should be read with these corrections therein that the same may conform to the record of the case in the Patent Office.

Signed and sealed this 18th day of February, A. D. 1941.

[SEAL]

HENRY VAN ARSDALE,
*Acting Commissioner of Patents.*